United States Patent
Englund et al.

(10) Patent No.: US 8,619,689 B2
(45) Date of Patent: Dec. 31, 2013

(54) METHOD AND ARRANGEMENT IN A TELECOMMUNICATIONS SYSTEM

(75) Inventors: Eva Englund, Linkoping (SE); Magnus Johansson, Gothenburg (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 802 days.

(21) Appl. No.: 12/740,053

(22) PCT Filed: Oct. 27, 2008

(86) PCT No.: PCT/SE2008/051214
§ 371 (c)(1),
(2), (4) Date: Apr. 27, 2010

(87) PCT Pub. No.: WO2009/058075
PCT Pub. Date: May 7, 2009

(65) Prior Publication Data
US 2010/0260152 A1 Oct. 14, 2010

Related U.S. Application Data

(60) Provisional application No. 60/983,297, filed on Oct. 29, 2007.

(51) Int. Cl.
*H04W 4/00* (2009.01)
(52) U.S. Cl.
USPC ........... 370/329; 370/336; 370/345; 455/510; 455/517
(58) Field of Classification Search
USPC ........... 370/329, 336, 345, 349, 395; 455/69, 455/434, 422.1, 452, 510, 517
See application file for complete search history.

(56) References Cited

U.S. PATENT DOCUMENTS

| 6,430,171 B1 | 8/2002 | Ogami et al. |
| 2003/0095528 A1 | 5/2003 | Halton et al. |
| 2003/0133426 A1 | 7/2003 | Schein et al. |

(Continued)

FOREIGN PATENT DOCUMENTS

| JP | 2009524978 A | 7/2009 |
| WO | 2005060188 A1 | 6/2005 |

(Continued)

OTHER PUBLICATIONS

LG Electronics Inc "Discussion on Scheduling Request" 3GPP TSG-RAN WG2 #59bis, Oct. 8-12, 2007.*

(Continued)

*Primary Examiner* — Awet Haile
(74) *Attorney, Agent, or Firm* — Coats & Bennett, P.L.L.C.

(57) ABSTRACT

The present invention relates to a method and arrangement for triggering a Random Access Channel (RACH) procedure for requesting uplink resources on a random access channel to a radio base station (600) scheduler based on a change in terminal (700) buffer status as compared to a Buffer Status Report BSR stored in said terminal. In a first method step, the status of the present terminal buffer content, i.e. terminal buffer data, is compared with the status of said stored buffer status report BSR. A second method step involves initiating a RACH procedure for indicating a service request to said base station scheduler upon detecting a change of buffer status at said comparison. The service request includes an indicator of the status change as a trigger for said scheduler to assign uplink resources to said terminal.

14 Claims, 3 Drawing Sheets

(56) References Cited

U.S. PATENT DOCUMENTS

| | | | |
|---|---|---|---|
| 2005/0105553 A1 | 5/2005 | Zhang et al. | |
| 2005/0259662 A1* | 11/2005 | Kim et al. | 370/395.4 |
| 2005/0265301 A1* | 12/2005 | Heo et al. | 370/349 |
| 2006/0246847 A1* | 11/2006 | Kim et al. | 455/69 |
| 2009/0080380 A1* | 3/2009 | Chun et al. | 370/329 |
| 2010/0142457 A1* | 6/2010 | Chun et al. | 370/329 |
| 2010/0265896 A1* | 10/2010 | Park et al. | 370/329 |

FOREIGN PATENT DOCUMENTS

| | | |
|---|---|---|
| WO | 2006052086 A2 | 5/2006 |
| WO | 2007/024120 A1 | 3/2007 |
| WO | 2007024120 A1 | 3/2007 |
| WO | 2007091811 A1 | 8/2007 |
| WO | 2007091838 A1 | 8/2007 |
| WO | 2007101510 A1 | 9/2007 |

OTHER PUBLICATIONS

Ericsson, "Scheduling request triggering criterions for LTE," 3GPP TSG-RAN WG2 #59bis, Oct. 8-12, 2007, Shanghai, China, R2-074048.

* cited by examiner

METHOD AND ARRANGEMENT IN A TELECOMMUNICATIONS SYSTEM

TECHNICAL FIELD

The present invention relates to a method and arrangement in a telecommunications system, in particular it relates to a method and arrangement for requesting uplink resource allocations via a random access channel procedure in a telecommunications system.

BACKGROUND OF THE INVENTION

Radio access technologies for cellular mobile networks are continuously being evolved to meet the future demands for higher data rates, improved coverage and capacity. Example of recent evolutions of the Wideband Code Division Multiple Access, WCDMA, technology is High-Speed Packet Access, HSPA. Currently further evolutions of the 3G systems, 3G Long Term Evolution, LTE, including new access technologies and new architectures are being developed within the 3rd Generation Partnership Project, 3GPP, standardisation body.

One of the targets for LTE access technology is to improve set-up times, i.e. the User Equipment, UE, sometimes called mobile station or mobile terminal, shall be able to connect to the network and initiate a session quickly. The UE can be in one of two Radio Resource Control, RRC, states, RRC_IDLE or RRC_CONNECTED. When the UE is in RRC_CONNECTED state the UE has an RRC connection as opposed to when the UE is in RRC_IDLE. This means that a session can be initiated quickly without a RRC connection procedure. In a base station (e.g. NodeB or eNodeB) implementation it is therefore desirable to keep a user in RRC_CONNECTED state as long as possible. The base station must then be able to support a large number of users in this state. For example it could be desirable to keep up to 2000 UEs in RRC_CONNECTED per cell. In any base station implementation the number of users that can be handled in the scheduling process is limited by processing, hardware and/or memory capability. This means that only a subset of all users can be candidates for scheduling. The UEs that are in RRC_CONNECTED and are also candidates for scheduling are said to be in "session active" state. For example, a base station implementation could support 400 users in "session active".

When the number of UEs requesting sessions exceeds what can be handled in the base station implementation, session requests must be denied. However, the "session active" state is only visible internally in the base station implementation and is not known in the UE. It is therefore not possible to deny a UE to perform a session request that is initiated in the UE. In the UE a session request can be initiated through a Random Access Channel, RACH, procedure or, in case scheduling request resources are available through a scheduling request, SR.

Both Uplink, UL, and Downlink, DL, resource assignment is performed by the scheduler situated in the base station, eNodeB. The basic uplink scheduling concept is described below. The Physical Uplink Shared Channel, PUSCH, is a dynamically scheduled channel where resources are assigned dynamically on the Physical Downlink Control Channel, PDCCH. The SR channel is a dedicated semi-statically assigned channel where the UE can quickly acquire for resources on the PUSCH, the UE must however be synchronised in the UL to be able to use the SR. After a longer time of inactivity the UE typically loses UL synchronisation and the SR resources are typically revoked. In this case the UE must use a RACH procedure to initiate a new session.

To inform the UL scheduler of the UE's momentary traffic demands the standard will also support buffer status reports to indicate how much data there is to transmit and of what priority. Alternatively, the scheduler may configure the UE to always send from the highest prioritised data flow. In this case it is sufficient to monitor the priority of the transmitted data. The scheduler monitors the users' traffic demands and assigns resources accordingly. The scheduler informs the users of the scheduling decision by transmitting resource assignments on the PDCCH.

The random access procedure is performed for the following five events:
1. Initial access from RRC_IDLE;
2. Initial access after radio link failure;
3. Handover requiring random access procedure;
4. DL data arrival during RRC_CONNECTED requiring random access procedure;
   E.g. when UL synchronisation status is "non-synchronised";
5. UL data arrival during RRC_CONNECTED requiring random access procedure;
   E.g. when UL synchronisation status is "non-synchronised" or there are no dedicated scheduling request channels available.

The invention relates to the fifth event, i.e. UL data arriving during RRC_CONNECTED and the UE is either non-synchronised or has no scheduling request channel available. In this case a contention based RACH procedure is used.

The contention based random access procedure involves four steps:
1. Random Access Preamble on RACH in uplink (from UE to eNodeB);
2. Random Access Response on Downlink Shared Channel, DL-SCH (from eNodeB to UE);
3. First scheduled UL transmission on Uplink Shared Channel, UL-SCH (from UE to eNodeB;
4. Contention Resolution on DL-SCH (from eNodeB to UE).

The contention based RACH procedure is subject to collisions from other users in the cell. As the number of users (all users in RCC_CONNECTED) that could potentially initiate a RACH procedure increases, the probability of collisions on the RACH channel increases and performance degrades quickly. It is therefore important not to have a too high load on the RACH channel, i.e. not too many procedures initiated per UE.

Normally, a session can proceed after the RACH procedure is performed. However, in case the base station cannot handle more users due to limited resources not all users can be scheduled further and the base station must prioritise between users depending on the priority of the data.

A possible solution is to let the UE initiate a RACH procedure regularly, for example related to Transmission Time Interval, TTI, as long as there is data in the UE transmit buffers but the UE does not have an uplink scheduling request resource or does not have UL synchronisation. This solution however has certain drawbacks as illustrated in FIGS. 1 and 2.

FIG. 1 illustrates that if the UE is allowed to repeat the RACH procedure frequently, there will be a high load on the RACH channel and the PDCCH channel. FIG. 2, on the other hand, illustrates that if the UE only is allowed to repeat the RACH procedure seldom, there is risk for a long delay before the scheduler is made aware of high priority data.

The procedure illustrated in both of FIGS. 1 and 2 starts with the UE obtaining data of lower priority and then initiating a RACH procedure 100 by transmitting a RACH preamble to the base station, 102. At this point the scheduler does not know the priority of the data and grants, 104, the UE enough resources so that the UE can respond with at least a buffer status report, BSR, 106. Suppose now, that the base station is close to the maximum number of users that is can support in session active and based on the BSR the base station decides not to schedule the UE further. The base station then prioritizes other users based on the BSR, 108.

If, according to the scenario of FIG. 1, the UE is allowed to repeat the RACH procedures regularly, 110, 120, this will cause an unnecessary high load on the RACH channel and the PDCCH channel, 112. It will also cost unnecessary UE power. In the illustrated example, high priority data arrives after the third RACH procedure 120. In the fourth procedure 130 the scheduler is made aware of the high priority data.

FIG. 2 illustrates that if the UE, on the other hand, is only allowed to repeat the RACH procedure seldom, 200, 210, there is risk for a long delay. In this example, the high priority data arrives after the second RACH procedure 210, but the base station is not made aware until the third procedure 220, causing the delay 214. This data could for example consist of an urgent handover report that is unnecessarily delayed.

SUMMARY OF THE INVENTION

In at least one embodiment, the present invention provides an alternative solution for triggering an uplink service request via a Random Access Channel (RACH) procedure in a communications system that at least to a certain extent alleviates some of the problems indicated above.

Further, one or more embodiments of the present invention define the initiation of a RACH request to be related to specified buffer changes in a mobile terminal.

Furthermore, one or more embodiments of the present invention provide or otherwise define triggering conditions for a random access channel request in order to inform the base station about particular changes in the terminal's buffer state.

According to one aspect, the present invention relates to a method in a mobile terminal of a wireless communication system for triggering a random access channel, i.e. RACH, procedure for requesting uplink resources on a random access channel to a base station scheduler based on a change in terminal buffer status as compared to a buffer status report BSR stored in the terminal. As an option the stored BSR may be acknowledged upon receipt of it. In a first method step, the status of the present terminal buffer content, i.e. terminal buffer data, is compared with the status of the stored buffer status report BSR stored in the terminal. A second method step involves initiating a RACH procedure for indicating a service request to the base station scheduler upon detecting a change of buffer status at the comparison. The service request includes an indicator of the buffer status change as a trigger for the scheduler to assign uplink resources to the terminal.

According to one embodiment of this aspect of the invention, the buffer status is determined changed if at least one out of the following set of criteria or conditions is fulfilled:
  (i) higher prioritized data has arrived in the buffer,
  (ii) buffer size increase exceeds a Threshold A,
  (iii) the time passed since previous RACH initiation exceeds a Threshold B.

According to another embodiment of this aspect of the invention, Thresholds A and/or B are configured in the terminal through radio resource control, i.e. RRC, signalling.

According to a further embodiment of this aspect of the invention, the comparison of buffer status comprises comparing at least one of buffer content priority and radio bearer priority for the respective present and previously stored buffer status data.

Yet an embodiment of this aspect of the invention comprises setting the service request trigger indicator to a single bit value if a change in the buffer status is detected and the terminal has data to transmit and has no uplink resource grant or scheduling request.

In yet another embodiment of this aspect of the invention the comparison of present and previously stored buffer status data is performed according to a predetermined time interval, for example related to transmission time interval, i.e. TTI.

An alternative embodiment of this aspect of the invention comprises sending, if an uplink resource is allocated for data transmission and buffer status is detected unchanged, a message comprising a single bit indicator for informing the base station scheduler to maintain the uplink resource allocation.

A further embodiment of this aspect of the invention comprises the step of resetting the latest buffer report to zero buffer content when the terminal has emptied its entire buffer. If the option of acknowledging BSR as mentioned above is used, it is the latest acknowledged buffer report, which is reset to zero buffer content.

A second aspect of the present invention relates to a method in a base station of a wireless communication system for scheduling resources to a mobile terminal through a random access, RACH, procedure. In a first method step, the base station may receive a service request from the terminal via a random access preamble on a random access channel RACH uplink. In a second method step, an initial resource may be allocated to the terminal for receiving a terminal buffer status report in return. In a third method step, further uplink resources may be allocated to the terminal, upon receiving a subsequent service request from the terminal, the subsequent request including an indicator of a change of terminal buffer status.

The method may further comprise the optional step of transmitting an acknowledgement message of the received terminal buffer status report to the terminal upon receipt of the terminal buffer status report.

According to one embodiment of this aspect of the invention, the buffer status is determined changed if at least one of the following preconfigured conditions is indicated fulfilled:
  higher priority data is indicated received in the buffer,
  total buffer size increase is indicated exceeding a Threshold A, and
  time since previous RACH initiation is indicated exceeding a Threshold B.

A third aspect of the present invention relates to a base station capable of scheduling resources to a mobile terminal through a random access (RACH) procedure. The base station may comprise a processor unit, a memory unit and a communication interface. The memory unit is used to store a copy of the buffer status report, BSR. The processor unit is arranged to grant an initial resource to the terminal upon receipt of a first service request initiated via a first RACH procedure. The processor unit is further arranged to receive a BSR from the mobile terminal. As an option, the processor unit may further be arranged to acknowledge receipt of the report to the terminal. The processor unit is also arranged to allocate uplink resources for data transmissions to the terminal based on receipt of a second service request, initiated via a second RACH procedure, the request indicating a change of buffer status of the terminal as compared to the buffer status of the previously stored BSR.

A fourth aspect of the present invention relates to a mobile terminal capable of indicating a service request for resource allocation to a base station scheduler through a random access procedure, RACH, in a communication system. The mobile terminal may comprise a processor unit, a memory unit and a communication interface. The processor unit may comprise a data transmit buffer for buffering data to be transmitted in the communication system. The processor unit may further comprise a comparator for comparing present buffer content status to the status of the stored latest transmitted buffer content. The processor unit may also comprise a service request triggering mechanism. The service request triggering mechanism is arranged to send a single bit message on a random access channel to a scheduler, triggering the scheduler to assign uplink resources for data transmission, when a change in buffer status is detected at the comparison. The memory unit may be used to store the latest terminal buffer status data transmission.

According to one embodiment of this aspect of the invention, the buffer status is determined changed if at least one of the following preconfigured conditions is fulfilled:
  higher priority data is stored in the terminal buffer,
  total buffer size increase exceeds a Threshold A, and
  time since previous RACH procedure initiation exceeds a Threshold B.

The present invention according to the aspects and embodiments thereof described herein provides the advantage that the scheduler in the base station is quickly provided with the information of higher prioritized data arriving in the terminal transmit buffers without causing unnecessarily high load on control channels and unnecessary UE power consumption. This will lead to improved handover handling with decreased drop rates and longer battery life time.

The features described above in relation to the method according to the invention may, where applicable, also be implemented in an arrangement according to the invention with the same advantages as described in relation to the method.

It goes without saying that the above aspects of the invention may be combined in the same embodiment. In the following, preferred embodiments of the invention will be described with reference to the drawings.

BRIEF DESCRIPTION OF THE DRAWINGS

The present invention will hereinafter be explained in greater detail by means of non-limiting examples and with reference to the appended drawings in which.

DETAILED DESCRIPTION OF PREFERRED EMBODIMENTS

The invention will, in the following, be exemplified by embodiments. It is to be understood, however, that the embodiments are included in order to explain principles of the invention and not to limit the scope of the invention, defined by the appended claims.

The present invention involves a method, user equipment and base station adapted to provide an alternative rule for the UE to initiate a Random Access Channel procedure, i.e. a RACH procedure.

Figure 1:
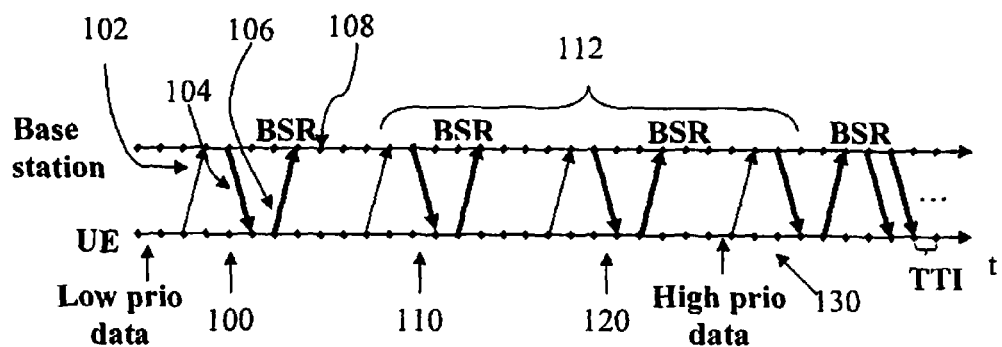
FIG. 1 illustrates a prior art solution for a RACH procedure.
Figure 2:
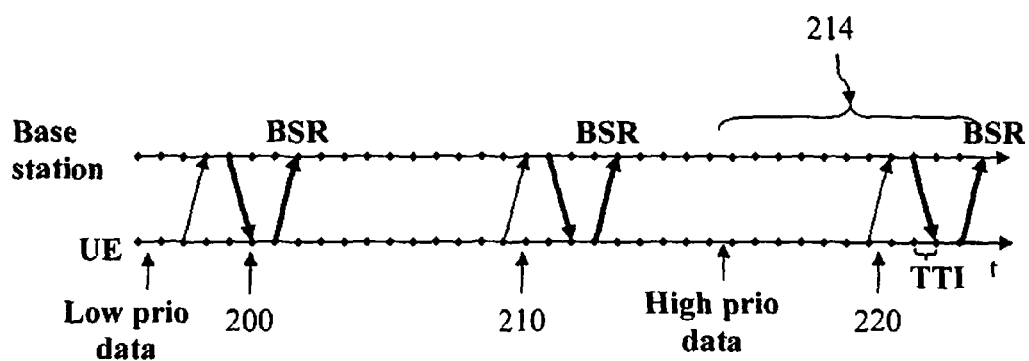
FIG. 2 illustrates another prior art solution for a RACH procedure.

The UE should only be allowed to initiate a RACH procedure in case there has been a certain change in the buffer status compared with what was revealed in the latest uplink transmission or buffer report. With this alternative triggering certain problems with the prior art, for example as described above and illustrated in FIGS. 1 and 2, may be solved.

In the present invention rules for initiating a RACH procedure have been extended. Roughly, the UE may initiate a RACH procedure only if there have been specified changes in the buffer content compared to what has been reported previously or what has been transmitted previously, e.g. if data of higher priority compared with the previously reported or transmitted has arrived. The changes in buffer status that trigger a RACH procedure are typically configured through RRC.

An advantage with the present invention is that the scheduler in the base station, e.g. eNodeB, is quickly provided with the information of higher prioritized data arriving in the transmit buffers without causing unnecessarily high load on control channels and unnecessary UE power consumption. This will lead to improved handover handling with decreased drop rates and longer battery life time.

One example of a set of triggering criteria may be as follows:
  A RACH procedure is initiated if:
  UE has no UL grant or scheduling request and UE has data to transmit and the buffer status has changed since latest buffer report according to configured conditions,
  The buffer status is considered to have changed if any of the following conditions are met:
    1. Higher prioritized data has arrived in buffer,
    2. Total buffer size increase>Threshold A,
    3. Time since previous RACH initiation>Threshold B.

In an alternative embodiment, at least two of the conditions above may have to be fulfilled for the buffer status to be considered or determined changed for initiating a RACH procedure.

The thresholds A and/or B may typically be configured through RRC, i.e. radio resource control, signalling.

In an embodiment, the UE resets the "latest buffer report" to zero buffer content after the UE has emptied the entire buffer, regardless if a report is transmitted to the scheduler and acknowledged or not.

In the above example, when a UE has an UL grant, the scheduler is made aware of the buffer content through regular buffer status reports. This could be a continuous buffer report for each scheduled transmission. Alternatively, similar criteria can be used also for triggering of the buffer status reports. This means that if a UE is not granted further resources the latest buffer report will be up-to date.

In the following, method steps of a preferred embodiment for triggering requesting a resource allocation via a RACH procedure according to the present invention is described being based on a change in terminal buffer status as compared to a Buffer Status Report, BSR, stored in the terminal.

Figure 3:
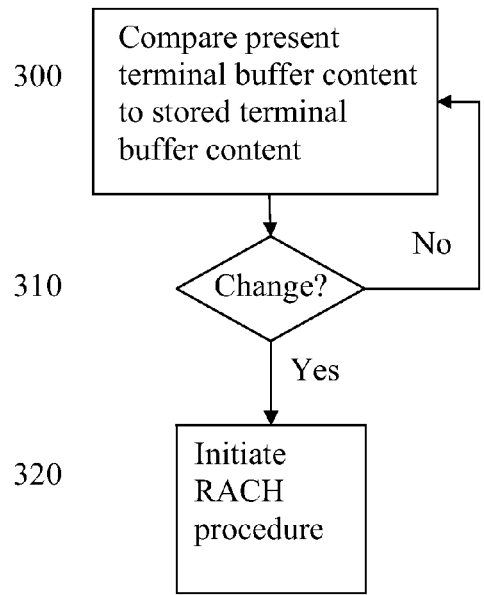
FIG. 3 is a flowchart of a method in a mobile terminal according to the invention.

The flowchart of a method in a mobile terminal according to an embodiment of the invention is illustrated in FIG. 3. In a first method step 300, the status of the present terminal buffer content, i.e. terminal buffer data, is compared with the status of the stored BSR. A second method step 320 involves initiating a RACH procedure for indicating a service request to a base station scheduler upon detecting 310 a change of buffer status at the comparison. The service request includes an indicator of the status change as a trigger for the scheduler to assign uplink resources to said terminal.

Figure 4:
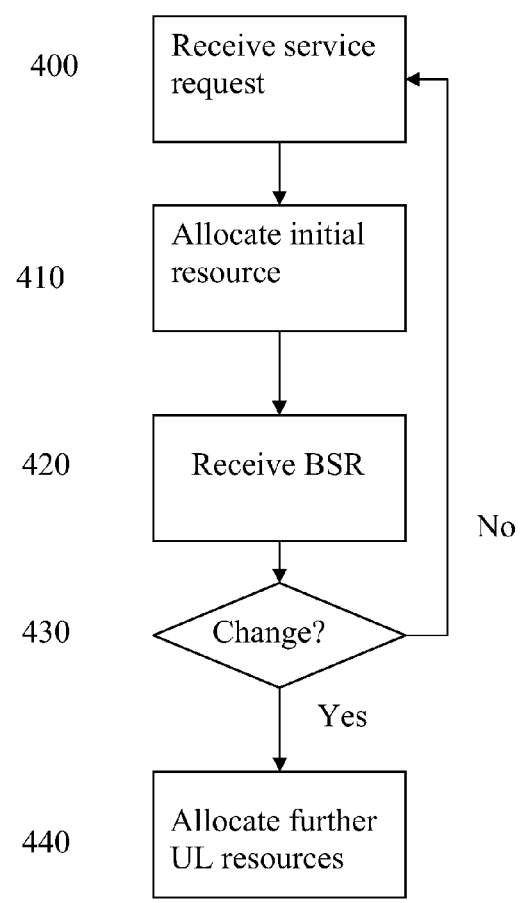
FIG. 4 is a flowchart of a method in a base station according to the invention.

The flowchart of a method in a base station according to an embodiment of the invention is illustrated in FIG. 4. In a first method step 400, the base station receives a service request from the terminal via a random access preamble on a random access channel RACH uplink. In a second method step 410, an initial resource may be allocated to the terminal for receiving a terminal buffer status report in return 420. Further uplink resources may be allocated to the terminal 440, upon receiving a subsequent service request from the terminal, the subsequent request including an indicator of a change 430 of terminal buffer status.

Figure 5:
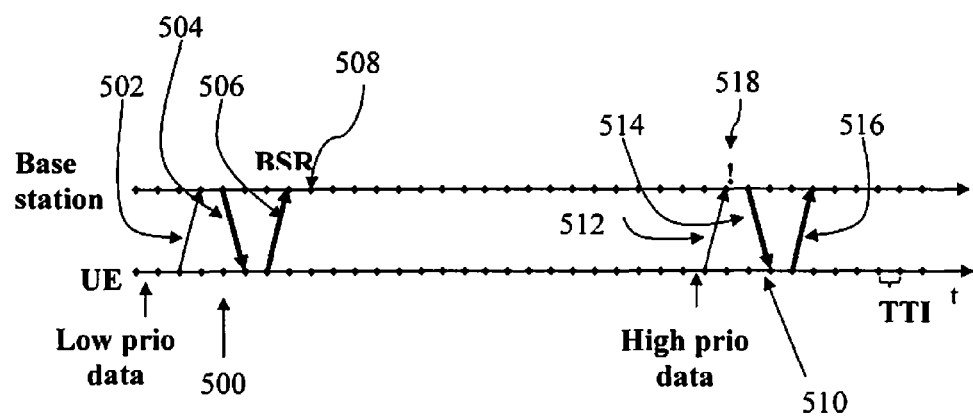
FIG. 5 illustrates a RACH procedure according to the invention.

In FIG. 5 an alternative embodiment of the present invention is illustrated. The first RACH procedure 500 occurs like explained for FIG. 1: The procedure starts with the mobile terminal obtaining data of lower priority and then initiating a RACH procedure 500 by transmitting a RACH preamble to the base station, 502. At this point the scheduler does not know the priority of the data and grants, 504, the terminal enough resources so that the terminal can respond with at least a BSR, 506. The base station then prioritizes other users based on the BSR, 508. When the mobile terminal is not scheduled in favour of other terminals, the terminal receives a hybrid automatic repeat-request acknowledgement, i.e. a HARQ ACK, for the transmission containing the buffer report (or data transmission). The mobile terminal and the base station stores the latest acknowledged report, which status report also may be stored in the base station. When higher priority data arrives the terminal is permitted to initiate a new RACH procedure 510. Already when the RACH preamble is transmitted 512, the base station can conclude that higher priority data has arrived in the mobile terminal transmit buffer and can adjust the grant issued 514 accordingly. For example, the scheduler could assign enough resources for the terminal to transmit a typical RRC message, 516.

Figures 6, 7:
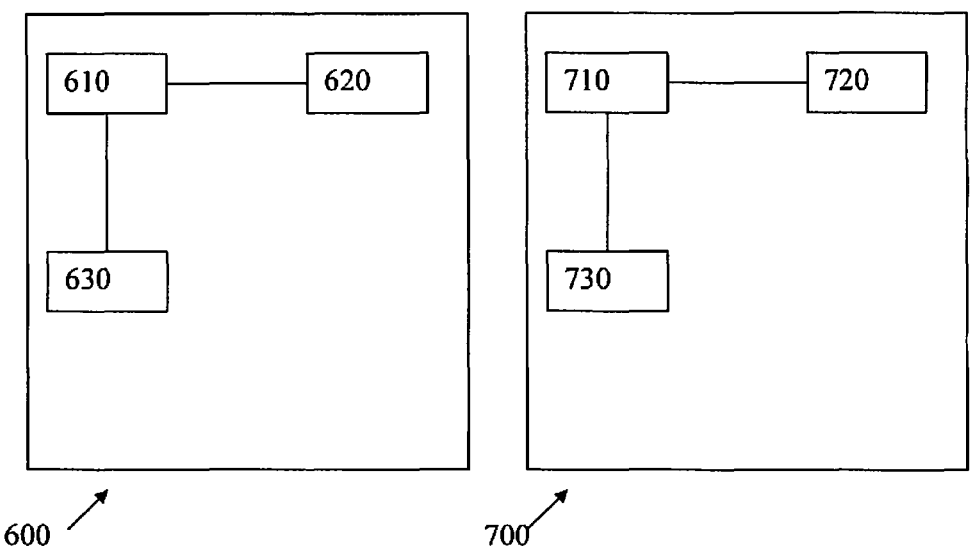
FIG. 6 is a schematic illustration of a base station according to an embodiment of the invention.
FIG. 7 is a schematic illustration of a mobile terminal according to an embodiment of the invention.

Suitable equipment for carrying out the methods of the present invention is shown in FIGS. 6 and 7, disclosing a base station and a mobile terminal, respectively.

FIG. 6 illustrates schematically a base station according to an embodiment of the invention. The base station may comprise a processor unit 610, a memory unit 620, and a communication interface 630. The processor unit may be any suitable type of processing device capable of handling software or hardware instructions, e.g. a microprocessor, digital signal processor, Application Specific Integrated Circuit (ASIC), or a Field Programmable Gate Array (FPGA), and the memory unit may be at least one of a volatile and/or non-volatile memory type, e.g. a RAM of suitable type, Hard Disk, Flash memory, and so on. The memory unit 620 is used to store a copy of the BSR. The processor unit 610 is arranged to grant 504 an initial resource to the terminal upon receipt of a first service request 502 initiated via a first RACH procedure 500. The processor unit 610 is further arranged to receive a BSR 506 from the mobile terminal. As an option, the processor unit 610 may further be arranged to acknowledge receipt of the report to the terminal. The processor unit 610 is also arranged to allocate uplink resources for data transmissions to the terminal based on receipt of a second service request 512, initiated via a second RACH procedure 510, the request indicating a change of buffer status of the terminal as compared to the buffer status of the previously stored BSR. The base station may further comprise other components depending on type and configuration of base station, e.g. power supply/converter, antenna(s), and so on.

A mobile terminal 700 capable of indicating a service request for resource allocation to a base station scheduler through a RACH procedure according to the invention is illustrated in FIG. 7. The mobile terminal 700 may comprise a processor unit 710, a memory unit 720 and a communication interface 730. The processor unit may be any suitable type of processing device capable of handling software or hardware instructions, e.g. a microprocessor, digital signal processor, Application Specific Integrated Circuit (ASIC), or a Field Programmable Gate Array (FPGA), and the memory unit may be at least one of a volatile and/or non-volatile memory type, e.g. a RAM of suitable type, Hard Disk, Flash memory, and so on. The processor unit 710 may comprise a data transmit buffer for buffering data to be transmitted in the communication system. The processor unit 710 may further comprise a comparator for comparing present buffer content status to the status of the stored latest transmitted buffer content. The processor unit 710 may also comprise a service request triggering mechanism. The service request triggering mechanism is arranged to send a single bit message on a random access channel to a scheduler, triggering the scheduler to assign uplink resources for data transmission, when a change in buffer status is detected at the comparison. The memory unit 720 may be used to store the latest terminal buffer status data transmission. The mobile terminal may further comprise other components depending on type and configuration of base station, e.g. power supply/converter, antenna(s), and so on.

The method steps of the invention described herein may be implemented by computer program software stored in a computer readable storage medium, e.g. a memory unit, and executed by a processor in a network node, such as a base station also called NodeB or eNodeB, and/or user terminal, sometimes called UE, user equipment, mobile terminal or mobile station. The methods steps may also be implemented in hardware instructions such as in an ASIC (Application Specific Integrated Circuit) or FPGA (Field Programmable Gate Array).

Any examples and terminology relating to 3GPP LTE standard being used herein should not be seen as limiting the scope of the invention, the methodology of which in principle can be applied to any communication system.

The described subject matter is of course not limited to the above described and in the drawings shown embodiments, but can be modified within the scope of the general concept of the invention.

The invention claimed is:

1. A method, in a mobile terminal, of a wireless communication system for triggering a random access channel (RACH) procedure for requesting uplink resources on a random access channel to a base station scheduler, the method comprising:
    comparing a present buffer status of a present buffer content of a mobile terminal buffer with a previous buffer status of a previous buffer content stored in said mobile terminal;
    initiating the RACH procedure for indicating a service request to said base station scheduler upon detecting a change of said present buffer status at said comparison relative to the previous buffer status, said service request including an indicator of the change of the present buffer status as a trigger for said base station scheduler to assign uplink resources to said mobile terminal.

2. The method according to claim 1, wherein the present buffer status is determined changed if at least one out of the following conditions is fulfilled:
   (i) higher prioritized data has arrived in said mobile terminal buffer;
   (ii) buffer size increase exceeds a Threshold A; and
   (iii) the time passed since a previous RACH initiation exceeds a Threshold B.

3. The method according to claim 2, wherein at least one of the Thresholds A and B are configured in the mobile terminal through radio resource control (RRC) signaling.

4. The method according to claim 1, wherein the comparison of the present buffer status comprises comparing at least one of a buffer content priority and a radio bearer priority for the respective present buffer status and previous buffer status.

5. The method according to claim 1, wherein the service request trigger indicator is set to a single bit value if the change in the present buffer status is detected and the mobile terminal has data to transmit and has no uplink resource grant or scheduling request channel available.

6. The method according to claim 1, wherein the comparison of the present buffer status and the previous buffer status is performed according to a predetermined time interval.

7. The method according to claim 6, wherein the predetermined time interval is related to transmission time interval (TTI).

8. The method according to claim 1, the method further comprising sending, if an uplink resource is allocated for data transmission and the present buffer status is detected as unchanged, a message comprising a single bit indicator informing the base station scheduler to maintain the allocation of the uplink resource.

9. The method according to claim 1, the method further comprising resetting a buffer report to zero buffer content when the mobile terminal has emptied its entire buffer.

10. A method, in a base station of a wireless communication system, for scheduling resources to a mobile terminal through a random access channel (RACH) procedure, said method comprising:
   receiving a service request from the mobile terminal via a random access preamble on a RACH uplink;
   allocating an initial resource to the mobile terminal for receiving a terminal buffer status report in return; and
   upon receiving a subsequent service request from the mobile terminal via the RACH, the subsequent service request including an indicator of a change of a present buffer status of a present buffer content of a mobile terminal buffer as compared to a previous buffer status of a previous buffer content of the mobile terminal buffer, allocating further uplink resources to the mobile terminal.

11. The method according to claim 10, wherein the present buffer status is determined changed if at least one of the following preconfigured conditions is indicated fulfilled:
   higher priority data is indicated received in said mobile terminal buffer;
   total buffer size increase is indicated exceeding a Threshold A; or
   the time passed since a previous RACH initiation exceeds a Threshold B.

12. A base station configured for scheduling resources to a mobile terminal through a random access channel (RACH) procedure, said base station comprising:
   a processor unit;
   a memory unit; and
   a communication interface;
   wherein the processor unit is arranged to store a copy of a buffer status report (BSR) in the memory unit;
   wherein the processor unit is further arranged to grant an initial resource to the mobile terminal upon receipt of a first service request initiated via a first RACH procedure; and
   wherein the processor unit is further arranged to allocate uplink resources for data transmissions to the mobile terminal based on receipt of a second service request, initiated via a second RACH procedure, the second service request indicating a change of a present buffer status of a present buffer content of a mobile terminal buffer as compared to a previous buffer status of a previous buffer content of the mobile terminal buffer.

13. A mobile terminal configured for indicating a service request for resource allocation to a base station scheduler through a random access channel (RACH) procedure in a communication system, said mobile terminal comprising:
   a memory configured to store a previous buffer status of a previous buffer content;
   a processor unit, including:
      a data transmit buffer configured for buffering data to be transmitted in the communication system;
      a comparator configured for comparing a present buffer status of a present buffer content of a mobile terminal buffer with the previous buffer status of the previous buffer content; and
      a service request triggering mechanism configured for sending a single bit message on a random access channel to the base station scheduler, for triggering the base station scheduler to assign uplink resources for data transmission, when a change of the present buffer status is detected at said comparison; and
   a communication interface operatively associated with the processor unit.

14. The mobile terminal according to claim 13, wherein the present buffer status is determined changed if at least one of the following preconfigured conditions is fulfilled:
   higher priority data is stored in the terminal buffer;
   total buffer size increase exceeds a Threshold A; and
   the time passed since a previous RACH procedure initiation exceeds a Threshold B.

* * * * *